United States Patent
Nickelson et al.

(10) Patent No.: US 7,172,371 B2
(45) Date of Patent: Feb. 6, 2007

(54) METHOD OF SEALING CASINGS OF SUBSURFACE MATERIALS MANAGEMENT SYSTEM

(75) Inventors: Reva A. Nickelson, Shelley, ID (US); John G. Richardson, Idaho Falls, ID (US); Kevin M. Kostelnik, Idaho Falls, ID (US); Paul A. Sloan, Rigby, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 11/273,962

(22) Filed: Nov. 14, 2005

(65) Prior Publication Data

US 2006/0239778 A1    Oct. 26, 2006

Related U.S. Application Data

(60) Division of application No. 10/813,810, filed on Mar. 30, 2004, now Pat. No. 7,029,203, which is a division of application No. 10/062,817, filed on Feb. 1, 2002, now Pat. No. 6,758,634, and a continuation-in-part of application No. 09/729,435, filed on Dec. 4, 2000, now Pat. No. 6,575,663.

(60) Provisional application No. 60/267,320, filed on Feb. 6, 2001.

(51) Int. Cl.
  *B09B 1/00* (2006.01)
(52) U.S. Cl. .................... 405/279; 405/129.8

(58) Field of Classification Search ............... 405/279; 277/316
See application file for complete search history.

(56) References Cited

U.S. PATENT DOCUMENTS

| | | | |
|---|---|---|---|
| 0,876,306 A | | 1/1908 | Pyle |
| 910,421 A | | 1/1909 | Schlueter |
| 2,101,285 A | | 12/1937 | Stevens |
| 2,312,579 A | * | 3/1943 | O'Brien ............... 277/316 |
| 3,411,305 A | | 11/1968 | Cella |
| 3,542,375 A | * | 11/1970 | Renwick ............... 277/933 |

(Continued)

FOREIGN PATENT DOCUMENTS

JP          5604 1923 A       4/1981

OTHER PUBLICATIONS

"Subsurface Containment and Monitoring Systems: Barriers and Beyond" Leslie Pearlman, National Network of Environmental Management Studies Fellow for U.S. Environmental Protection Agency. Mar. 1999.

*Primary Examiner*—John Kreck
(74) *Attorney, Agent, or Firm*—TraskBritt, P.C.

(57) ABSTRACT

Systems, components, and methods relating to subterranean containment barriers. Laterally adjacent tubular casings having male interlock structures and multiple female interlock structures defining recesses for receiving a male interlock structure are used to create subterranean barriers for containing and treating buried waste and its effluents. The multiple female interlock structures enable the barriers to be varied around subsurface objects and to form barrier sidewalls. The barrier may be used for treating and monitoring a zone of interest.

9 Claims, 11 Drawing Sheets

U.S. PATENT DOCUMENTS

| | | |
|---|---|---|
| 4,557,759 A | 12/1985 | McGrew et al. |
| 4,601,615 A | 7/1986 | Cavalli |
| 4,632,602 A | 12/1986 | Hovnanian |
| 4,634,187 A | 1/1987 | Huff et al. |
| 4,664,560 A * | 5/1987 | Cortlever ............... 405/129.8 |
| 4,670,305 A | 6/1987 | Morgenthaler et al. |
| 4,676,693 A | 6/1987 | Hiroshima et al. |
| 4,741,644 A | 5/1988 | Cavalli et al. |
| 4,947,470 A | 8/1990 | Darilek |
| 4,949,076 A | 8/1990 | Wann |
| 4,997,313 A | 3/1991 | Gibson et al. |
| 5,009,266 A | 4/1991 | Dieter |
| 5,013,185 A | 5/1991 | Taki |
| 5,018,576 A | 5/1991 | Udell et al. |
| 5,030,034 A | 7/1991 | Bodine |
| 5,037,240 A | 8/1991 | Sherman |
| 5,054,961 A | 10/1991 | Sherman |
| 5,076,727 A | 12/1991 | Johnson et al. |
| 5,106,233 A | 4/1992 | Breaux |
| 5,127,771 A | 7/1992 | Wind |
| 5,180,251 A | 1/1993 | Peurat et al. |
| 5,199,816 A | 4/1993 | Peurat et al. |
| 5,240,348 A | 8/1993 | Breaux |
| 5,259,705 A | 11/1993 | Breaux et al. |
| 5,280,243 A | 1/1994 | Miller |
| 5,305,798 A | 4/1994 | Driver |
| 5,324,433 A | 6/1994 | Grant et al. |
| 5,340,406 A | 8/1994 | Fearon |
| 5,354,149 A | 10/1994 | Breaux |
| 5,360,293 A * | 11/1994 | Breaux et al. ............... 405/267 |
| 5,388,931 A | 2/1995 | Carlson |
| 5,460,032 A | 10/1995 | Hampton et al. |
| 5,476,992 A | 12/1995 | Ho et al. |
| 5,487,622 A | 1/1996 | Cherry et al. |
| 5,531,895 A | 7/1996 | Alford et al. |
| 5,551,807 A | 9/1996 | Breaux |
| 5,570,974 A | 11/1996 | Jax et al. |
| 5,584,610 A | 12/1996 | Simpson et al. |
| 5,605,417 A | 2/1997 | Englert et al. |
| 5,611,642 A | 3/1997 | Wilson |
| 5,676,207 A | 10/1997 | Simon et al. |
| 5,716,164 A | 2/1998 | Biro et al. |
| 5,758,993 A | 6/1998 | Schmednecht et al. |
| 5,765,965 A | 6/1998 | Carter, Jr. et al. |
| 5,800,096 A * | 9/1998 | Barrow ............... 405/267 |
| 5,816,344 A | 10/1998 | Turner |
| 5,816,748 A | 10/1998 | Kleiser et al. |
| 5,818,241 A | 10/1998 | Kelly |
| 5,861,090 A | 1/1999 | Clarke et al. |
| 5,879,110 A | 3/1999 | Carter, Jr. |
| 5,905,184 A | 5/1999 | Carter, Jr. |
| 5,961,437 A | 10/1999 | Smith et al. |
| 5,971,440 A | 10/1999 | Boatman |
| 5,975,800 A | 11/1999 | Edwards et al. |
| 6,016,714 A | 1/2000 | Smith et al. |
| 6,099,206 A | 8/2000 | Pennell |
| 6,102,617 A | 8/2000 | Hampton |
| 6,106,197 A | 8/2000 | Kozak et al. |
| 6,135,057 A | 10/2000 | Cummings |
| 6,138,752 A | 10/2000 | Bass et al. |
| 6,189,890 B1 * | 2/2001 | Moulin et al. ............... 277/935 |
| 6,250,848 B1 | 6/2001 | Moridis et al. |
| 6,258,273 B1 | 7/2001 | Gee |
| 6,280,118 B1 | 8/2001 | Suthersan et al. |
| 6,281,801 B1 | 8/2001 | Cherry et al. |
| 6,312,605 B1 | 11/2001 | Kerfoot |
| 6,427,402 B1 | 8/2002 | White |
| 6,457,905 B1 | 10/2002 | Nickell |
| 6,575,663 B2 | 6/2003 | Kostelnik et al. |
| 6,648,552 B1 | 11/2003 | Smith et al. |
| 6,758,633 B2 | 7/2004 | Yen |
| 6,802,670 B2 | 10/2004 | Kostelnik et al. |
| 6,851,890 B2 | 2/2005 | Kostelnik et al. |
| 6,896,446 B2 | 5/2005 | Kostelnik et al. |
| 6,910,829 B2 | 6/2005 | Nickelson et al. |

* cited by examiner

METHOD OF SEALING CASINGS OF SUBSURFACE MATERIALS MANAGEMENT SYSTEM

RELATED APPLICATIONS

This application is a divisional of U.S. application Ser. No. 10/813,810, filed Mar. 30, 2004, entitled SUBSURFACE MATERIALS MANAGEMENT AND CONTAINMENT SYSTEM, COMPONENTS THEREOF AND METHODS RELATING THERETO, now U.S. Pat. No. 7,029,203 which is a divisional of Ser. No. 10/062,817 filed on Feb. 1, 2002 now U.S. Pat. No. 6,758,634, granted Jul. 6, 2004, which claims the benefit of U.S. Provisional Application No. 60/267,320, filed Feb. 6, 2001, entitled SUBSURFACE MATERIALS MANAGEMENT AND CONTAINMENT SYSTEM, which is incorporated herein by reference in its entirety. Furthermore, this application is a continuation-in-part of U.S. application Ser. No. 09/729,435, filed Dec. 4, 2000, entitled ADVANCED CONTAINMENT SYSTEM, now U.S. Pat. No. 6,575,663 which is incorporated by reference herein in its entirety.

GOVERNMENT RIGHTS

The United States Government has rights in the following invention pursuant to Contract No. DE-AC07-99ID13727 and Contract No. DE-AC07-05ID14517 between the U.S. Department of Energy and Battelle Energy Alliance, LLC.

FIELD OF THE INVENTION

The present invention relates generally to methods, components and systems for in situ containment and management of buried waste, contaminated media, and their associated components. Also these methods and devices can be utilized for resource recovery. More particularly, embodiments of the present invention relate to an improved barrier, as well as to its installation and use, for reliably containing and managing leachate, gas phase contaminants, and the like, originating from a zone of interest.

BACKGROUND

Containment, management, and disposal of various types of waste are long-standing problems. Early waste management and disposal systems were primitive, as there were few or no disposal or environmental regulations in place at the time. In countless instances, the waste was simply buried underground. The volume of waste that has been buried is tremendous. Some experts estimate that landfills in the United States alone hold more than 3 million cubic meters of buried waste. Further, much of the waste that was buried comprises heavy metals such as mercury and cadmium, carcinogenic materials such as trichloroethylene, radioactive materials, and other hazardous substances.

While burial and similar approaches produced an aesthetically pleasing result by removing the waste from sight, it was soon discovered that effluent from the buried waste was working its way through the soil and into the groundwater. This process is commonly known as leaching. Because groundwater is a major source of water for drinking and for agriculture, contamination of the groundwater by leaching is a major concern.

The contamination caused by buried waste is not limited solely to groundwater however. At least some of the contaminated groundwater finds its way into waterways such as streams, rivers, and lakes, thus polluting those waterways and poisoning the plant and animal life. Obviously, polluted waterways pose a threat to humans as well, particularly in the case of waterways and bodies of water used for recreational purposes and/or as a source of drinking water.

Not all of the cases of groundwater pollution arise from the leaching of chemicals from waste sources. In some cases, the waste is buried in the path of the groundwater, and as groundwater flows through the waste, it collects various chemicals and toxins from the waste and deposits those chemicals and toxins in other soils and waterways.

While many of the problems associated with buried waste concern the effect of leachate on groundwater, buried waste also typically emits gas phase contaminants that must likewise be contained and managed. Such gas phase contaminants can also pollute the soil and the groundwater, and may build up to unsafe pressures which could ultimately result in explosion and/or atmospheric venting of the gas.

Clean soil and groundwater are important to human, plant, and animal life as well as to the environment in general. Accordingly, a variety of methods and devices have been devised to attempt to resolve the problems induced by buried waste. These remedies can be broadly grouped into the categories of remediation and containment. Remediation remedies focus on processes designed to change the chemical composition of a contaminated material or contaminant to one more benign, while containment remedies seek to eliminate the pollution problem by removing or isolating the contaminants and contaminated material from the surrounding area.

Remediation approaches such as biological treatments, thermal processes and chemical processes are problematic for a variety of reasons. In particular, many of these remediation techniques are expensive and potentially hazardous. Further, it is difficult to verify the effectiveness of many of the treatments and remediation-type approaches may not be appropriate for all types of contaminated material. Finally, determining the proper remediation technique is, in itself, a complex and time-consuming process, particularly in view of the web of regulations and procedures that govern such treatments.

Containment, barrier, or in situ, approaches are problematic as well. One known containment approach is simply to dig up and remove the contaminated soil for treatment and/or disposal. This approach is expensive and time-consuming and often accomplishes little more than moving the problem to another location. Other containment approaches involve installing vertical and/or horizontal barriers around the buried waste. In theory, this approach is attractive because it does not involve digging up or otherwise disturbing the buried waste.

However, conventional containment or barrier systems suffer from a variety of inadequacies including lack of durability, continuity and integrity. These inadequacies are a function of numerous factors associated with the environment in which the containment or barrier systems are located including, but not limited to: exposure to harsh chemicals such as concentrated saline solutions, and saturated calcite and gypsum solutions; exposure to extreme thermal gradients such as are typically experienced in freeze/thaw zones; and exposure to stresses induced by shifting in the earth.

Hydraulic conductivity, which is the rate at which a fluid or hazardous substance flows through a barrier, is unacceptably high in some barrier systems while other conventional barrier systems are not particularly well-suited to a variety of soil conditions such as hard rock and sand. A further flaw is that many barrier systems do not provide methods for evaluating the integrity of the barrier during and after installation, which is complicated by the fact that many barrier systems also lack provision for long term monitoring of the containment zone and any leachate therefrom. The inability to monitor a barrier system that is isolating hazardous waste is unacceptable because of the potential harm that can be caused to the surrounding environment. The lack of durability, continuity and integrity in known containment systems has a significant detrimental effect on the performance of those systems and the effectiveness of those containment and barrier systems cannot be readily determined or evaluated.

Accordingly, what is needed are improved in situ containment systems and methods for installing these systems. A containment system that is capable of containing, collecting and/or processing effluent which would otherwise escape from a zone of interest, wherein such effluent includes, but is not limited to, leachate, gas phase contaminants, waste, water, and any other material that is desired to be contained, collected, and/or processed would be advantageous.

BRIEF SUMMARY OF THE INVENTION

The present invention includes systems and methods relating to subterranean containment barriers. Tubular casings having male interlock structures and cooperative multiple female interlock recesses are used to create subterranean barriers for containing and treating buried waste and its effluents. The multiple interlocks allow the barriers to be varied in placement around subsurface objects and to form barrier sidewalls. The barrier may be used for treating and monitoring a zone of interest including contaminants.

Casing sections are interlocked to adjacent sections using the male interlocking structures and cooperative female interlock recesses. A sealant is disposed in the recess. Sealants may disposed prior to connecting adjacent casing sections, or after the interlock is formed. Thermoplastic sealants may be used to enable resealing in the event of a breach by reheating to reestablish the seal.

Methods of constructing the barrier include methods for reducing the intrusion of foreign matter into the interlocks during construction by blocking, methods of collecting and containing contaminants using the barrier structures. The components may also be used to treat zones of interest by removing contaminants therefrom, or introducing desired materials thereinto.

DETAILED DESCRIPTION OF THE ILLUSTRATED EMBODIMENTS

The threat to the environment produced by buried waste begins when the contaminants produced by buried waste leach into the groundwater. Once groundwater has been contaminated, the potential harm is great, because groundwater typically makes its way to rivers and lakes, which are frequently sources of drinking water and irrigation water. In this manner, the contaminants originally produced by buried waste make their way to plants, animals and humans.

A containment system including a barrier in accordance with the principles of the present invention addresses these and other concerns of buried waste by isolating a containment zone of interest, which provides several significant advantages. The systems, methods and apparatus of the present invention are capable of creating a continuous barrier of various sizes and configurations. The barriers can be installed in both saturated and unsaturated zones of interest and in a variety of geologies from soft soil to hard rock. Systems and methods for the verification of the barrier installation as well as structural continuity of the barrier are also included within the scope of the present invention.

As used herein, "buried waste" refers to, without limitation: construction and demolition materials such as lumber and concrete blocks; laboratory equipment such as glassware and tubing; process equipment such as valves, ion exchange resins, and heat exchangers; maintenance equipment such as oils and greases; decontamination materials such as paper, rags and plastics; hazardous and radioactive materials; and any other type of waste or garbage which is buried in the ground. The chemicals and other substances produced by buried waste which leach into the surrounding soil and groundwater are also encompassed by the term buried waste. "Zone of interest" refers to an area or volume of earth containing buried waste. A containment system is typically designed to isolate the zone of interest from the surrounding earth and water such that the buried waste and associated leachate is geographically confined to the zone of interest.

The present invention is described in terms of diagrams and figures. Using the diagrams and figures in this manner to present the invention should not be construed as limiting its scope. Rather, the diagrams and figures are intended to be exemplary embodiments of the present invention. Additionally, the diagrams and figures are not necessarily drawn to scale. It will be appreciated that other embodiments of the present invention are also be contemplated and such other embodiments are within the scope of the present invention.

Figure 1:
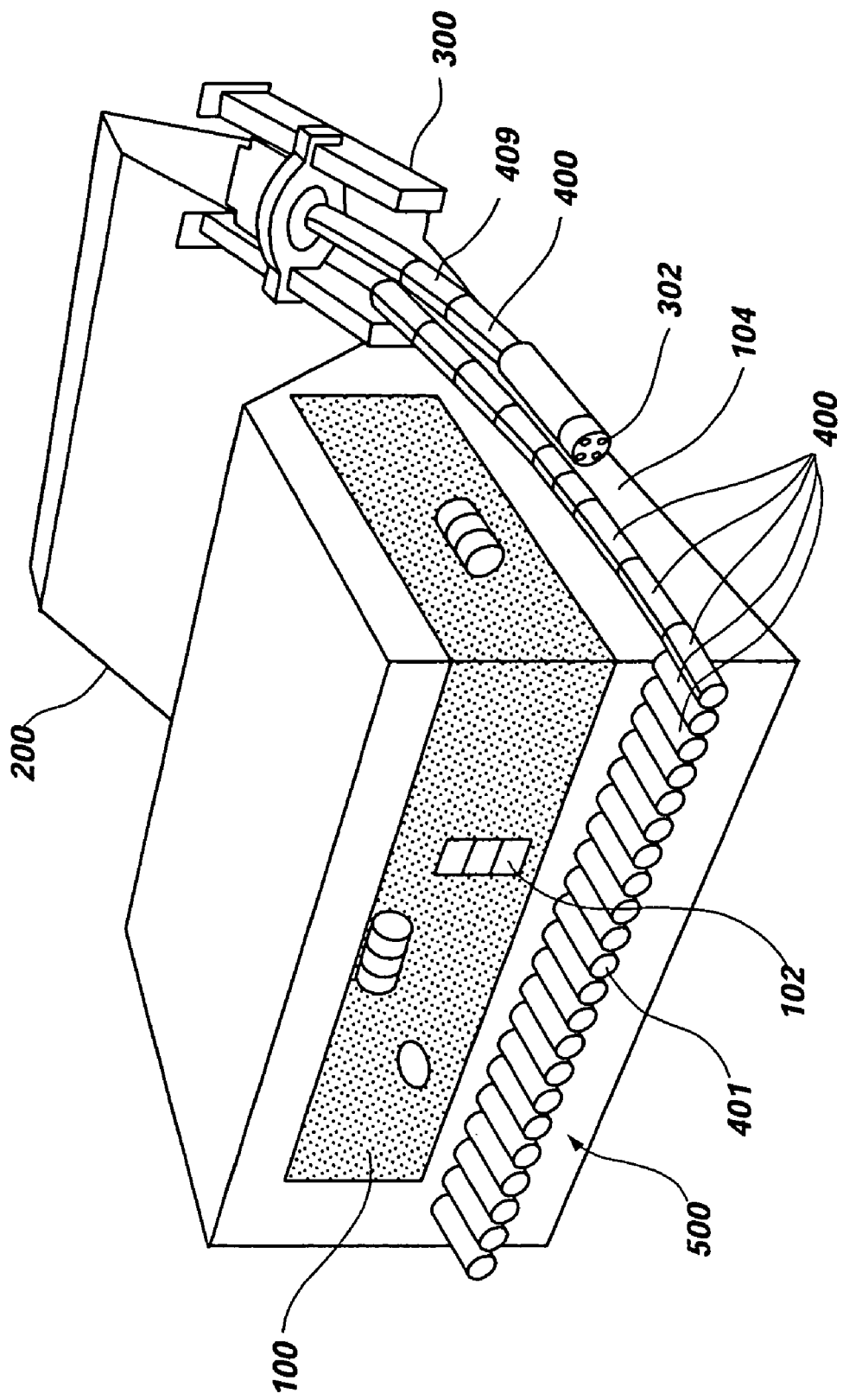
FIG. 1 is a perspective, partial cutaway view of a micro tunneling device installing casing sections underneath a contaminated zone of interest in accordance with a first embodiment of a subterranean barrier of the present invention.

FIG. 1 depicts a zone of interest 100 to be isolated by a first embodiment of a barrier 500 in accordance with the principles of the present invention. In order to contain zone of interest 100, a trench 200 is first excavated on either side of zone of interest 100 (only one trench is shown) containing buried waste 102. Micro tunneling device 300 is then placed in trench 200. Trench 200 facilitates the placement of micro tunneling device 300, but the creation of trench 200 may be omitted in some embodiments. If trench 200 is excavated, the removed soil, if contaminated, may be disposed of by appropriate and approved methods. Additionally, any soil excavated by tunneling device 300 also be collected, scanned, and disposed of by similar methods.

One type of micro tunneling device 300 is known as a micro tunnel boring machine, or micro TBM. In a currently preferred embodiment, micro tunneling device 300 comprises an auger head 302 or the like for rotary excavation of soil 104. However, it is contemplated that the inventive barrier system may be installed in any of a number of different types of soil and rock, or combinations thereof. Accordingly, installation of the containment or barrier system by other excavation devices including, but not limited to, 'double-tube down the hole' drills (preferred for hard soil and soft rock), rotary percussion drills (preferred for hard rock), Multi-face Tunnel Boring Machines, Multi-face Shielded Tunnel Boring Machines, a Shielded Tunnel Boring Machine coupled with a Horizontal Cutting Screw Auger, Pipe Propulsion, Curved Pipe Propulsion, Trench Cutting, and the like is contemplated as being within the scope of this invention. Attainable boring and installation speeds are about 50 meters/day of tunnel through soft soil, about 25 meters/day of tunnel through hard soil/soft rock, and about 8 meters/day of tunnel through hard rock.

In order to contain the buried waste in a zone of interest, micro tunneling device 300 serially drills a plurality of parallel tunnels underneath the zone of interest. Preferably, each tunnel is substantially circular in cross-section. However, this invention contemplates as within its scope tunnels of a wide variety of other, different cross sectional shapes. Each tunnel of FIG. 1 begins in trench 200 and ends in another trench 200 (not shown) on the other side of zone of interest 100. Micro tunneling device 300 lines each tunnel with longitudinal adjacent casing sections 400 so as to form a tube 401 inside each tunnel as drilling progresses. One of the functions of casing sections 400 installed during tunneling is to support the portion of the tunnel already drilled behind auger head 302 or other boring head. Casing sections 400 comprise a hollow elongated body 409 having a length defining a longitudinal axis and a perimeter around the longitudinal axis. The body 409 may have any cross-sectional shape desired. Casing sections 400 are optimally constructed of steel, ceramics, aggregate, polymers and other materials selected according to the compressive strength, flexibility and corrosion resistance that is desired or required for the resulting barrier and formed according to methods known in the art. It will be appreciated that alternative casing materials may be selected and used in order to provide proper protection and containment for differing types of waste, the collection or containment of other substances, or the support of other structures. Casings 400 may include a corrosion resistant coating, such as an epoxy, a polymer such as, polytetrafluoroethylene (Teflon® polymer), bonded ceramic or polymers, to extend their useful lives. In one exemplary embodiment, each casing section 400 may be about 0.5 meters in diameter and in the range of about 50 meters to about 150 meters long.

Figure 1B:
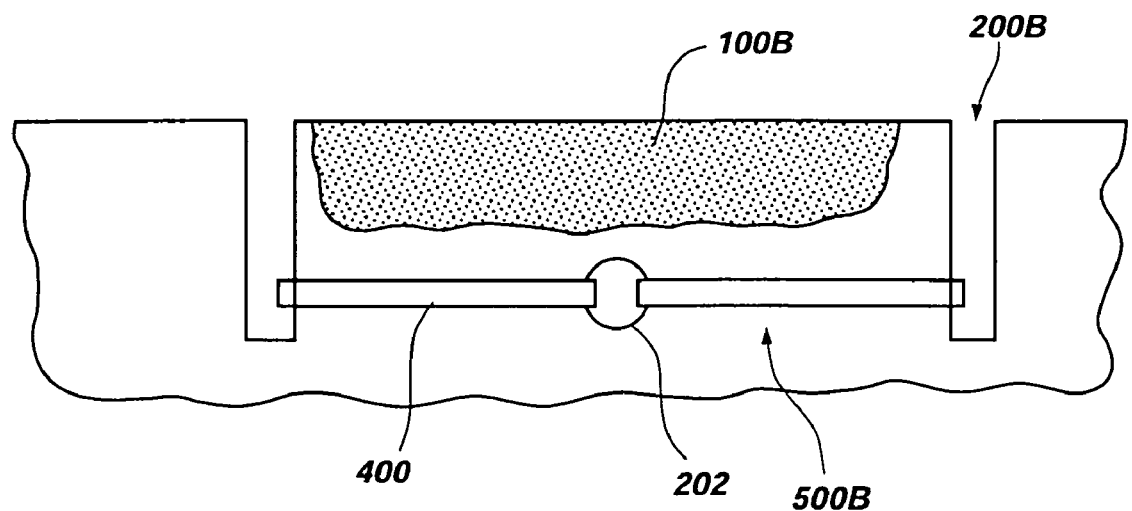
FIG. 1B is a side view of a third embodiment of a subterranean barrier in accordance with the present invention.
Figure 1A:
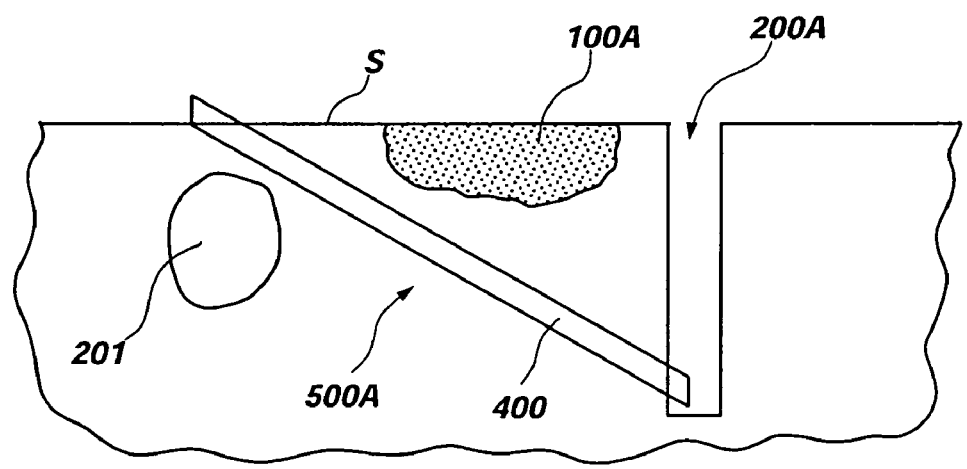
FIG. 1A is a side view of a second embodiment of a subterranean barrier in accordance with the present invention.

FIG. 1A illustrates a second embodiment of a barrier 500A used to contain a zone of interest. In the FIG. 1A embodiment, a single trench 200A is excavated on one side of the zone of interest 100A. This may be done where desired, or where a subsurface object 201 prevents the placement of a second trench 200A. The barrier 500A is formed by boring laterally adjacent tunnels and lining with casing sections 400 as described previously herein, only the barrier is formed by running the casing sections 400 from the surface S to the single trench 200A.

FIG. 1B similarly illustrates yet another embodiment of a barrier 500B that may be used to contain a zone of interest 100B. A central tunnel 202 is bored beneath the zone of interest. Two trenches 200B are excavated on opposite sides of the zone of interest 100B substantially parallel to central tunnel 202 and casings 400B are placed in laterally adjacent tunnels bored from each of the trenches 200B to the central tunnel 202, forming barrier 500B. A single section of casing 400 may be used for each trench-to-tunnel span, enabling barrier 500B to be formed without end to end joints between casing sections 400B. Central tunnel 202 may be used to collect leachate from certain embodiments of a barrier 500B, as will be discussed further herein, or for other monitoring and maintenance of the system.

Figure 2:
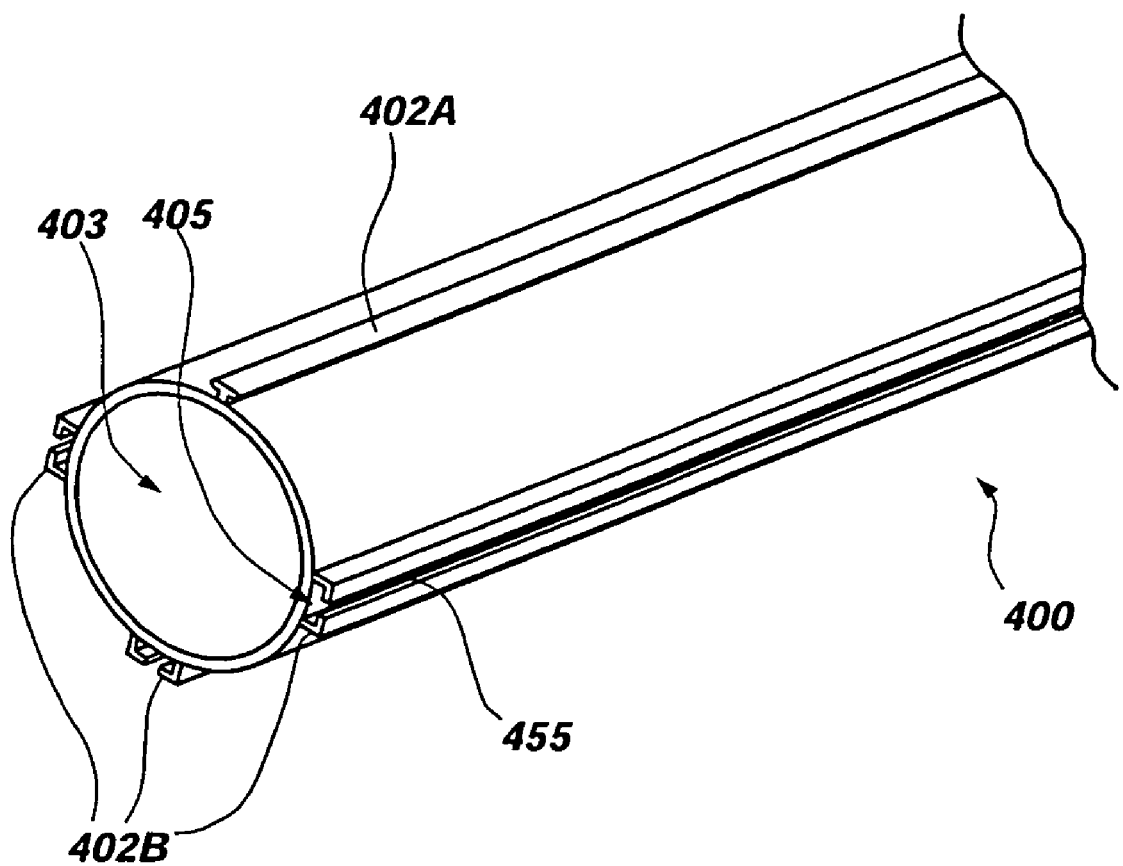
FIG. 2 is a perspective view of a first embodiment of a casing section in accordance with the present invention.

FIG. 2 illustrates one embodiment of casing 400 including complementary interlocking structures 402A and 402B configured to interlock laterally adjacent casing sections 400. Structure 402A is a T-shaped (in cross section) male interlock structure disposed externally on casing section 400 and running along the longitudinal axis. Each structure 402B is an externally disposed female interlock defining a channel 405 opening into an access slot 455. In some preferred embodiments, there are three female interlock structure 402Bs disposed at 90° intervals around the circumference of casing 400 with respect to one another and to male interlock 402A. Complementary interlocking structures 402A and 402B provide multiple benefits, for example these structures may be used to positively interlock laterally adjacent casing sections 400 and, once the first tunnel is drilled and lined with casing sections 400, a complementary interlocking structure 402B thereof serves to accurately and reliably guide complementary male interlocking structure 402A of laterally adjacent casing sections 400 into place, thus ensuring accurate placement and orientation of those casing sections 400, and, thus, of barrier segment 500 as a whole. Further, the multiplicity of female interlocks 402B allows for flexibility in the interconnections between casing sections 400, which will be discussed in further in connection with FIGS. 5 and 6. Once in position, the central bore 403 of a casing 400, and any space or volume within the female interlock structure 402B not occupied with male interlock 402A may be filled with a sealant such as grout or bentonite to provide further impermeability to the barrier 500, as will be discussed further below.

Figure 3:
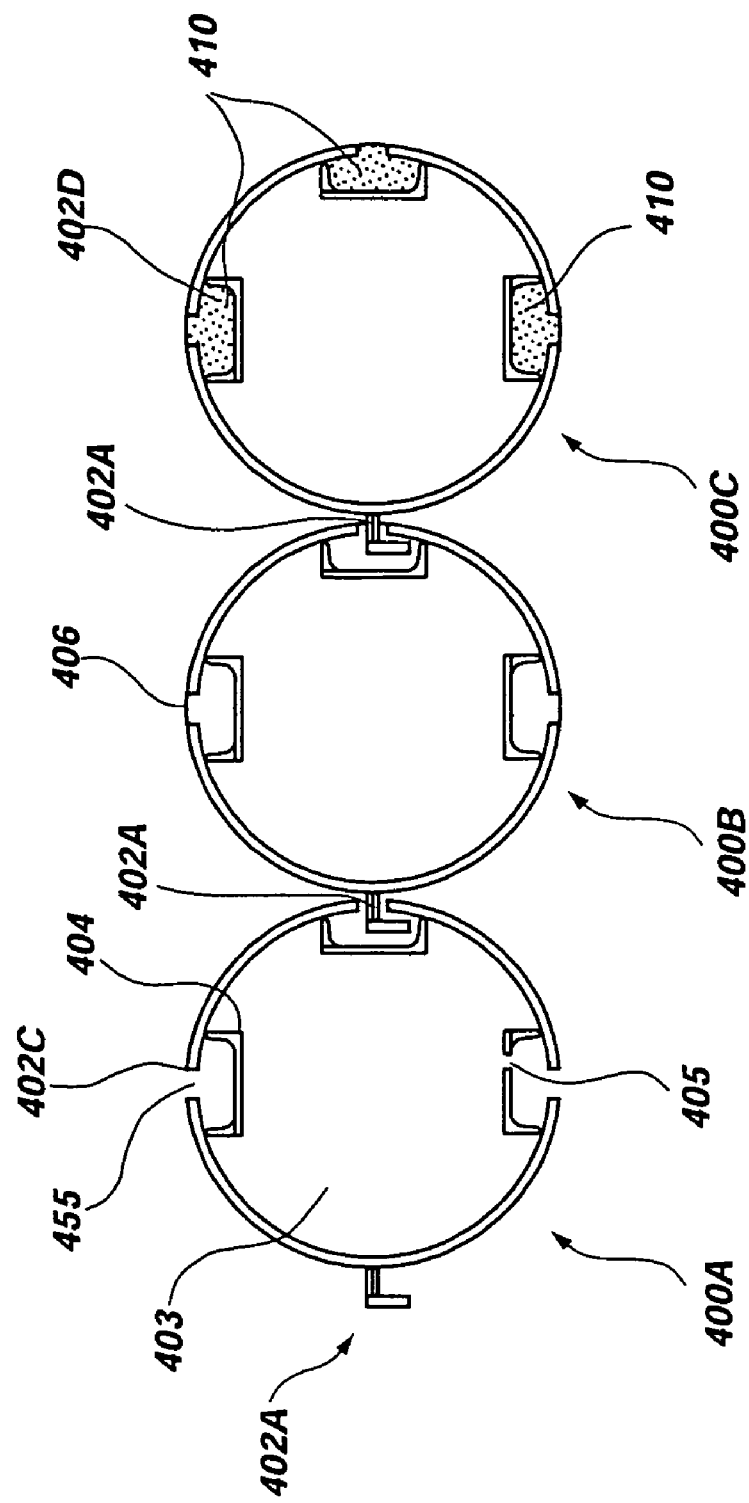
FIG. 3 is a front view of several alternative embodiments of casing sections in accordance with the present invention, shown as interlocked with one another.

FIG. 3 depicts several embodiments of casings 400 shown laterally interconnected to form a section of a barrier 500 that may be used in accordance with the teachings of the present invention. Casing 400A includes a generally T-shaped (in cross section) male interlock 402A disposed on the external surface of the casing 400A and running along a longitudinal axis thereof. Casing 400A further includes one or more female interlock structures 402C, formed as an internal channel 404 accessible from the external surface of the casing 400A through access slot 455. As barrier 500 is formed by interlocking laterally adjacent casings 400A, the interlock space between the external surface of each casing 400A body is reduced or eliminated by the receipt of male interlock structure 402A in channel 404, allowing for a stronger barrier 500 to be formed.

A number of bleed slots 405 may be formed in the wall of internal channel 404. If a sealant, such as grout or bentonite is injected into the central bore 403, it may pass through the bleed slots 405 into the interlock space allowing both bore 403 and the interlock volume to be filled and sealed in one operation. A portion of the casings 400A may be constructed of a semipermeable material such as a porous ceramic that allows air to pass therethrough. As the central bore 403 is filled with sealant, displaced air exits the casing 400A through the semipermeable material, which then becomes impermeable due to the filling of the pores therein with sealant. This reduces the problem of voiding and bubbles during sealant, such as grout, injection.

Figure 3A:
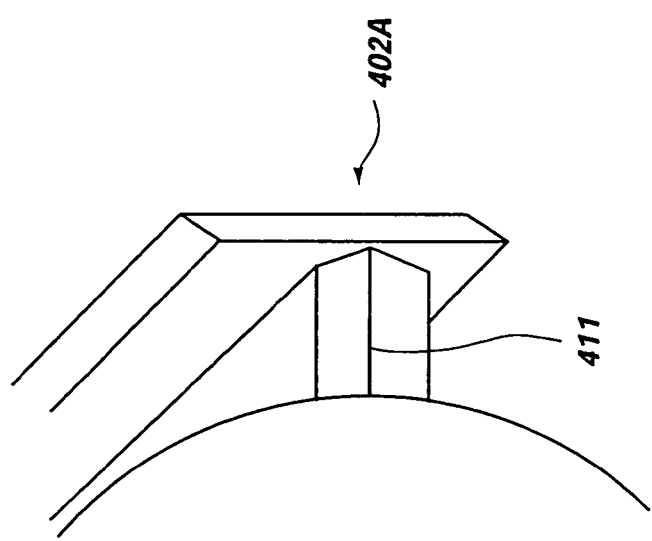
FIG. 3A is a back view of a portion of a male interlock structure made in accordance with the present invention.

One potential problem with the emplacement of casing sections is the introduction of extraneous material, such as dirt or debris, into the channels of female interlock structures 402B and 402C which dirt or debris may prevent entry of a male interlock structure 402A. Techniques for reducing this problem are included within the scope of the present invention. Casing 400B includes a frangible seal 406 located over the external openings of the female interlock structures 402C. Frangible seal 406 may be constructed of any suitable material, such as a ceramic, aggregate, thin section of frangible metal, a membrane (such as neoprene) or a selectively permeable material that may aid in using the casing for treating the zone of interest 100 (where the channels of female interlock structures 402B or 402C are not used for the interlock itself). As the casing 400B is emplaced, the frangible seal prevents foreign material from entering the female interlock 402C. As an adjacent casing, 400B is emplaced, the male interlock structure 402A thereof is inserted through access slot 455 down the length of female interlock structure 402B. The frangible seal 406 is broken, displaced, or cut by the male interlock, which may be assisted by a sharpened or slanted leading edge 411, such as that shown in FIG. 3A.

It will be appreciated that frangible seal 406 may include a seal, such as a neoprene membrane may be placed over the access slot 455. As the seal 406 is cut by the sharpened leading edge, it remains in place to form a seal between the female interlock structure 402B and the inserted male interlock structure 402A. This seal allows the enclosed volume of the bore 403 and interlock to be known, as leakage is prevented therefrom during filling. The volume of sealant injected therein may be measured to determine if voiding or other variances are occurring that may reduce the effectiveness of the barrier 500 and appropriate corrective measures taken.

Another technique for dealing with the problem of foreign material is illustrated by casing 400C. Female interlock structure 402D is filled with a sealant, such as a soft grout 410. As the casing is emplaced, foreign material is unable to enter the prefilled female interlock 402D. As an adjacent casing, 400C is emplaced, the male interlock structure 402A thereof is inserted through access slot 455 down the length of female interlock 402D. The sealant, such as soft grout 410, is displaced (which may be assisted by sharpened or slanted leading edge 411 shown in FIG. 3A, it will be appreciated that this process may be further assisted by the slanted leading edge 413 on the head 462 of the male interlock structure). A seal between adjacent casings 400C is thus formed by the interlocking. Displaced grout 410 may at least partially exit the female interlock 402D around the male interlock and remain thereon, creating a further seal.

Figure 3B:
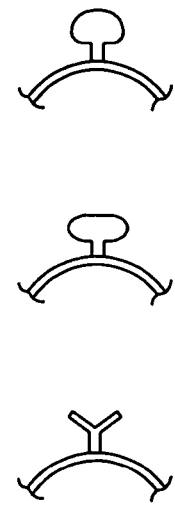
FIG. 3B depicts some alternative embodiments of male interlock structures in accordance with the present invention.

FIG. 3B depicts a number of different head 462 and neck 464 embodiments that may be used for male interlock structure 402A. It will be appreciated that any structure that is capable of being slidably inserted down the channel 404 through access slot 455, to reside therein, that may not be laterally removed from may be used. Embodiments where the enlarged head 462 is angled outwardly may be used to effectuate an improved seal by contacting the channel 404 wall when force is applied in a laterally separating direction to the barrier 500B.

Figure 4B:
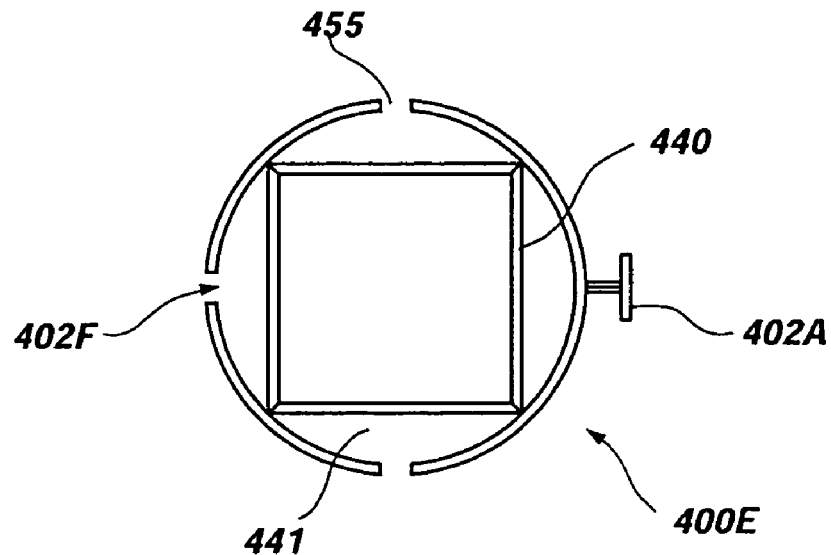
FIG. 4B is a front view of an additional embodiment of a casing section in accordance with the present invention.
Figure 4A:
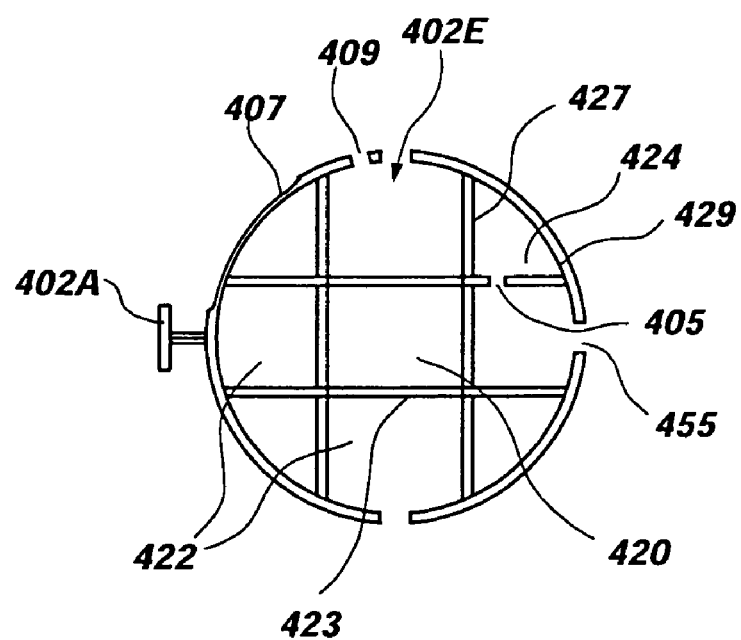
FIG. 4A is a front view of another embodiment of a casing section in accordance with the present invention.

FIG. 4A illustrates another embodiment of a casing 400D made in accordance with the principles of the present invention. Casing 400D includes four female channels 422, three of which are used to form the female interlock structures 402E in connection with an access slot 455. A central chamber 420 is formed between the female channels 422, either by the inner walls 423 thereof, or as a separate structure. Integral grout injection manifolds 424 are formed by the sidewalls 427 of the female channels 422 and the outer wall 429 of the casing 400D. Sealant may be injected into an appropriate manifold 424 and flow through bleed slots 405 into the interconnect structure volume in order to form an impermeable seal between adjacent casings 400D. Where a female channel 422 is prefilled with a sealant, such as a soft grout, the sealant may flow out of the channel 422 into a manifold 424 through the bleed slots 405 as it is displaced by the male interconnect 402A. This allows an impermeable seal to be formed between adjacent casings 400, without requiring the entire casing to be filled with a sealant or without the need for constructing separate grout injection manifolds. Alternatively, grout channels 407 located on the external surface of a casing 400D may be used to direct sealant flow over the surface of the casing 400D to create an additional sealing layer atop the barrier 500. Of course, it will be appreciated that grout flow openings 409 may be made directly in an external surface of a casing 400, allowing sealant injected therein to flow through and for this additional sealing layer.

FIG. 4B illustrates another embodiment of a casing 400E made in accordance with the principles of the present invention. Casing 400E contains an internal tube 440, which may be a square tube. Male interlock 402A is attached on the external surface of the casing 400E, as with the other embodiments discussed herein. Female interlocks 402F are formed by the longitudinal access slots 455 down the length of the casing 400E and internal chambers 441 created by the space between the internal tube 440 and the external wall of the casing 400E.

Casing embodiments similar to those depicted as 400D and 400E may ease manufacturing as they are capable of construction with all welding performed external to the pipe. For example, the internal tube 440 or central chamber and 420 and female channels 422 may be constructed by welding flat pieces to form the desired shapes. Additional pieces may then be welded to the internal structures to form the external surface of the casing 400. Where the curved pieces are used, accurate jigs may be utilized to maintain proper positioning. This allows the labor cost associated with the construction of a casing to be reduced, as well as eliminating a need for specialized welding tools to operate within the interlocks. It will, of course, be appreciated that internal structures may be formed by a suitable method, such as welding, and then slidably inserted down into a casing 400 and welded of other wise bonded thereto, whereupon access slots 455 may be cut into the external surface of the casing 400.

Casing embodiments that feature a central chamber 420 or internal tube 440 also add another level of flexibility for monitoring underground conditions and remediation. FIG. 4C illustrates a casing 400E adapted for such a purpose. Internal tube 440 and the internal chamber 441B used for interlocking with another casing 400 are filled with sealant 442 to provide an impermeable barrier. The topmost internal chamber 441A is left unfilled. The longitudinal access slot 455A is open to allow liquid or gaseous effluent to flow therein (either left open or covered by a permeable material). Effluent flows from the zone of interest through opening 455A into internal chamber 441A. The effluent may then flow through internal chamber 441A down the casing 400E (which may be sloped) to be collected for filtration, monitoring or other purpose. Where the barrier 500 includes a central tunnel 202, as in the embodiment shown in FIG. 1B, effluent may be collected and processed therein, or flow to the tunnel 202 and continue to flow therethrough to a collection location. The lower internal chamber 441C may be used for monitoring the barrier 500 and casing 400 integrity, as will be discussed further herein. The remaining internal chamber 441D (or any other unused chambers) may be filled with sealant to provide additional structural support or protection to the barrier 500.

Figure 4D:
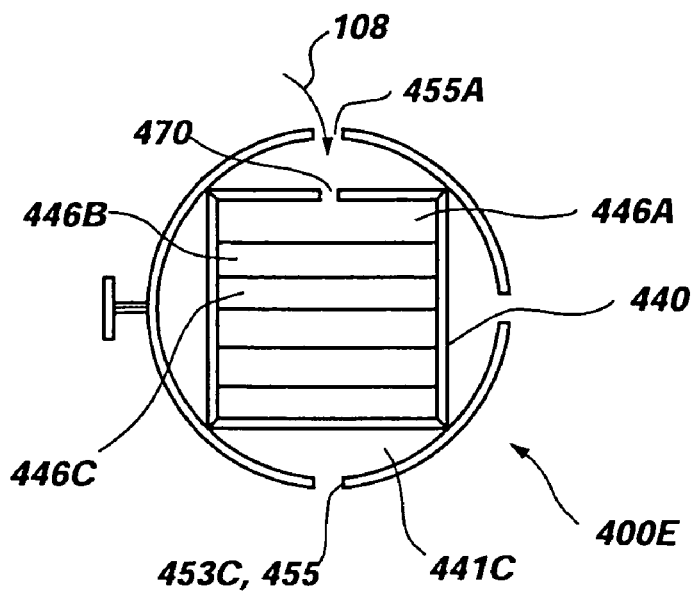
FIG. 4D is another front view of the embodiment of FIG. 4B, modified for use in treating an effluent from a zone of interest, in accordance with the present invention.
Figure 4C:
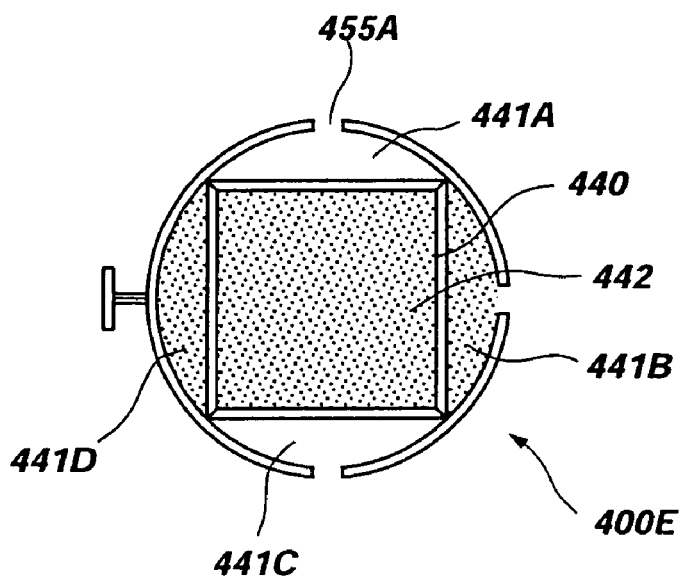
FIG. 4C is a front view of the embodiment of FIG. 4B, modified for use in treating a zone of interest, in accordance with the present invention.

As illustrated by FIG. 4D a casing 400E, may include reactive sections or components to extend barrier life, provide maintenance, or serve to pretreat materials that pass through selectively permeable portions of the barrier 500. Longitudinal access slot 455A is open to allow leachate (shown as arrow 108) or other liquid or gas effluent to flow therein to the topmost inner chamber 441A of a casing 400E of FIG. 4D. One or more layers of reactive material are contained in internal tube 440. The effluent is allowed to flow into the internal tube 440, through openings or vias 470, to contact a reactive layer 446A therein. Reactive layer 446A targets certain contaminants, either by filtration, or by reacting therewith. A plurality of layers 446A, B. C. etc. may be used to selectively treat a number of different contaminants, sequentially. The layers 446A, B. C. etc. may be formed as reactive trays or barrier slugs that can be removed and replaced from the barrier as the reactive layer 446A is exhausted, or to target different contaminants at different areas of the barrier.

Once the effluent has passed through the reactive layers, it may be allowed to exit the casing through bottom longitudinal opening 443C (again through opening or vias, not shown), or it may flow along the floor of internal tube 440, or lower internal chamber 441C (where lower longitudinal opening 455C is sealed) to a collection point, such as central tunnel 202 (see FIG. 1B). A number of different reactive layers 446 may be placed along the axis of a casing 400, such that a desired treatment series is encountered by an effluent flowing down a reactive casing 400. It will be appreciated that the barrier 500 may thus be used to contain collect and treat gas phase contaminants that pass through or emanate from the zone of interest. A vacuum may be applied through a selectively permeable wall of a casing 400 to extract gas phase contaminants. Conversely heat, chemical materials or biological agents may be delivered to a zone of interest through a selectively permeable wall of a casing 400. Combinations of active reactive treatments and reactive layers may be used to provide comprehensive treatment to a zone of interest.

Figure 5:
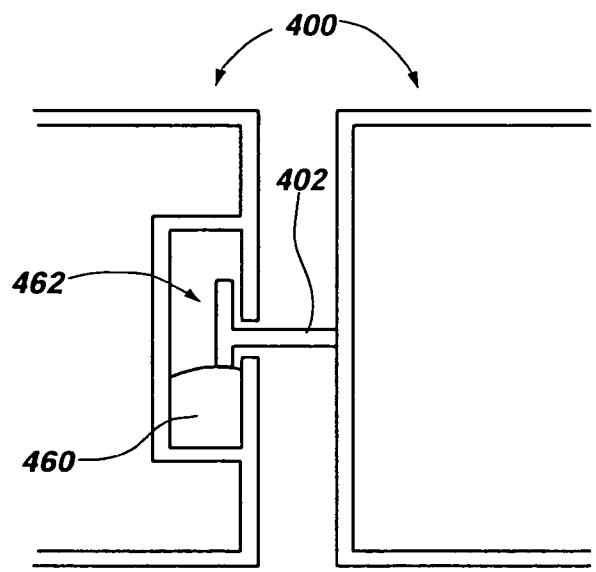
FIG. 5 is a cross-sectional view of one embodiment of an interlock recess, in accordance with the present invention.

As seismic activity occurs, the barrier 500 may shift, settle or otherwise move. It may therefor be advantageous to provide mechanisms to accommodate slight movements of casings 400 to occur without breaking the continuity of the barrier 500, or to facilitate repair thereof. Where casing 400 sections are welded together, movement may require rewelding any broken seals. FIG. 5 illustrates several methods for sealing an interlock space that can reduce the need to resort to such measures.

Male interlock 402A is at least partially embedded in sealant 460 to form an impermeable seal within the interlock space 462. Sealant 460 may be a material with a degree of elasticity that allows for some movement of the male interlock 402A with respect to the interlock space 462. For example, bentonite, waxes, rubbers, polysiloxane and polymeric sealants may provide a seal that tolerates some movement of the embedded male interlock 402A, without breaking the impermeable seal. Leaving additional space free of sealant in the interlock space 462 improves the ability for these elastic sealants to a maintain a seal. Some of these sealants 460, such as the thermoplastic polymers may also possess a degree of "self-healing" ability being able to slowly flow or move to recreate a breached seal without further intervention.

Where sealant 460 is a thermoplastic material, such as wax or a thermoplastic polymer, sealant 460 may be placed in the interlock space 462 prior to the emplacement of the casing 400 into the barrier 500. Sealant 460 may be conformed around the periphery, or in a portion, of the interlock space 462 to allow the male interconnect 462 to be inserted therein without interference. Heat may then be applied to soften the thermoplastic sealant, causing it to flow into place, creating an impermeable seal between adjacent casings 400. If the impermeable seal is later breached by seismic activity or another phenomenon, that does not damage the casings 400, the sealant may be reheated, causing it to reflow and reestablish the impermeable seal. Heat may be applied in any suitable manner, such as by pumping heated air or steam into the central bore 403 or central tube 440 of a casing 400 or by heating the casing 400 in the instance it is constructed of thermally conductive materials.

Where a more traditional sealant 460, such as grout or bentonite clay, is used, a specialized repair apparatus, such as a remote controlled robot that fits inside a casing 400, may be moved to the location of any void. Repairs may then be effected by filling the void with additional sealant, similar to the process of dental filling.

Figure 6:
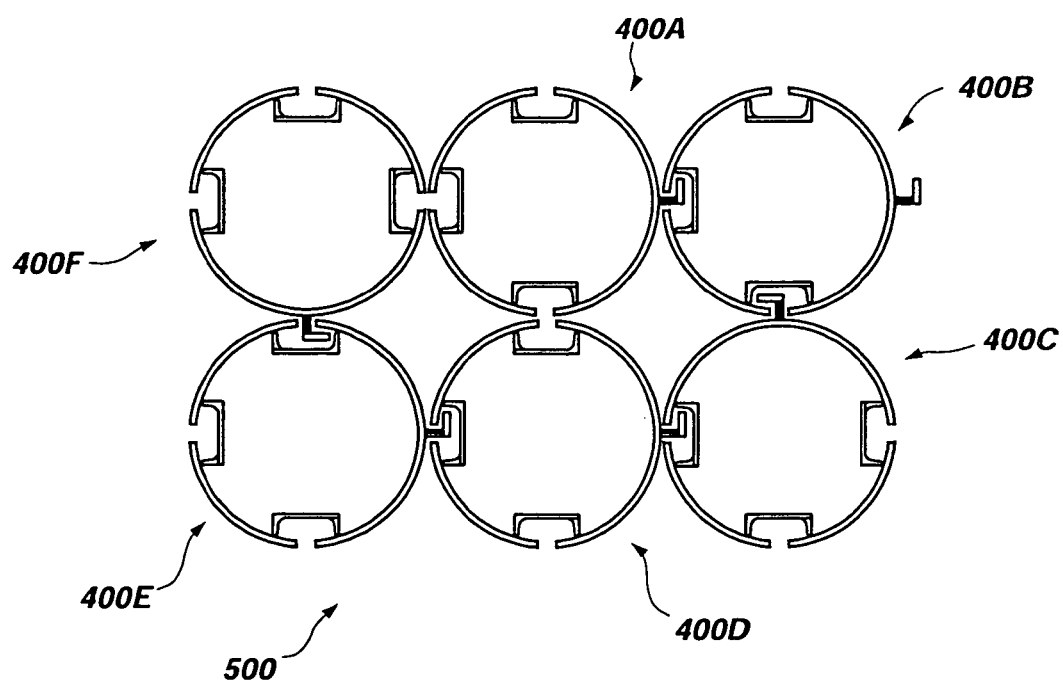
FIG. 6 is a front view of a section of a barrier, made in accordance with the present invention.

The multiple female interconnects 402B, 402C and 402D of the casings of the present invention provide additional flexibility in assembling a barrier 500. For example, where a barrier is placed in an area that limits the ability to recover a failed auger head, boring head or drill bit, such as a around a zone of interest that contains radioactive material, or where the cost of recovering an auger head, boring head or drill bit or replacing a failed casing 400 are high, the barrier 500 may be constructed by working around the failed section, as depicted in FIG. 6. Casing section 400A has experienced a failure, such as broken drill bit. Rather than attempt to extract and reinsert the casing 400A, casing 400C is emplaced underneath the prior casing 400B, interlocked into the bottommost female interlocking structure thereof. Adjacent casing section 400D is emplaced interconnected to casing 400C, directly underneath the failed casing 400A. Two more casing 400E and 400F are similarly interconnected from casing 400D to complete the work around. The barrier 500 is thus completed without the need to spend time and equipment repairing or recovering the failed casing 400A.

Figure 6A:
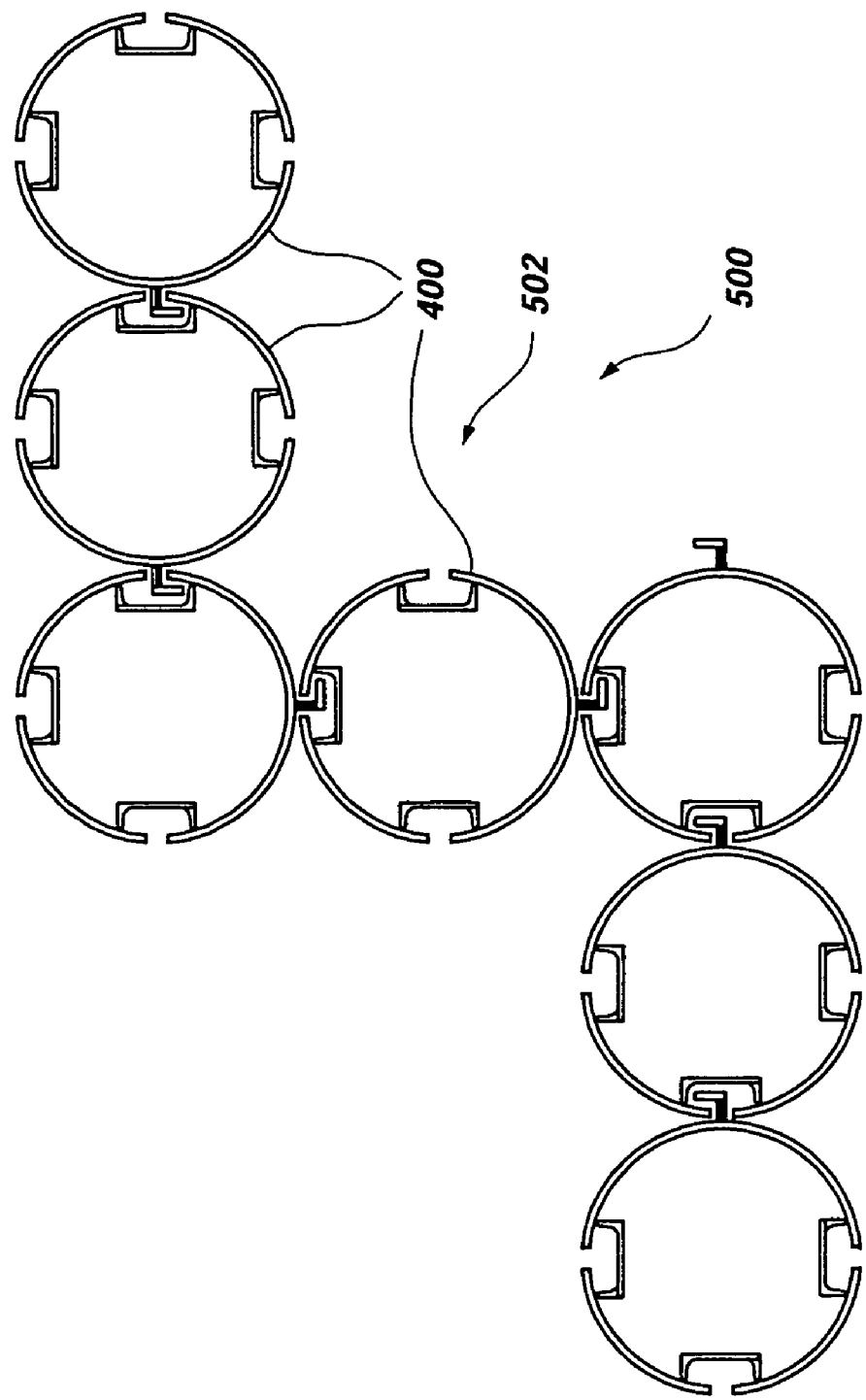
FIG. 6A is a front view of a different section of a barrier made in accordance with the present invention.
Figure 6B:
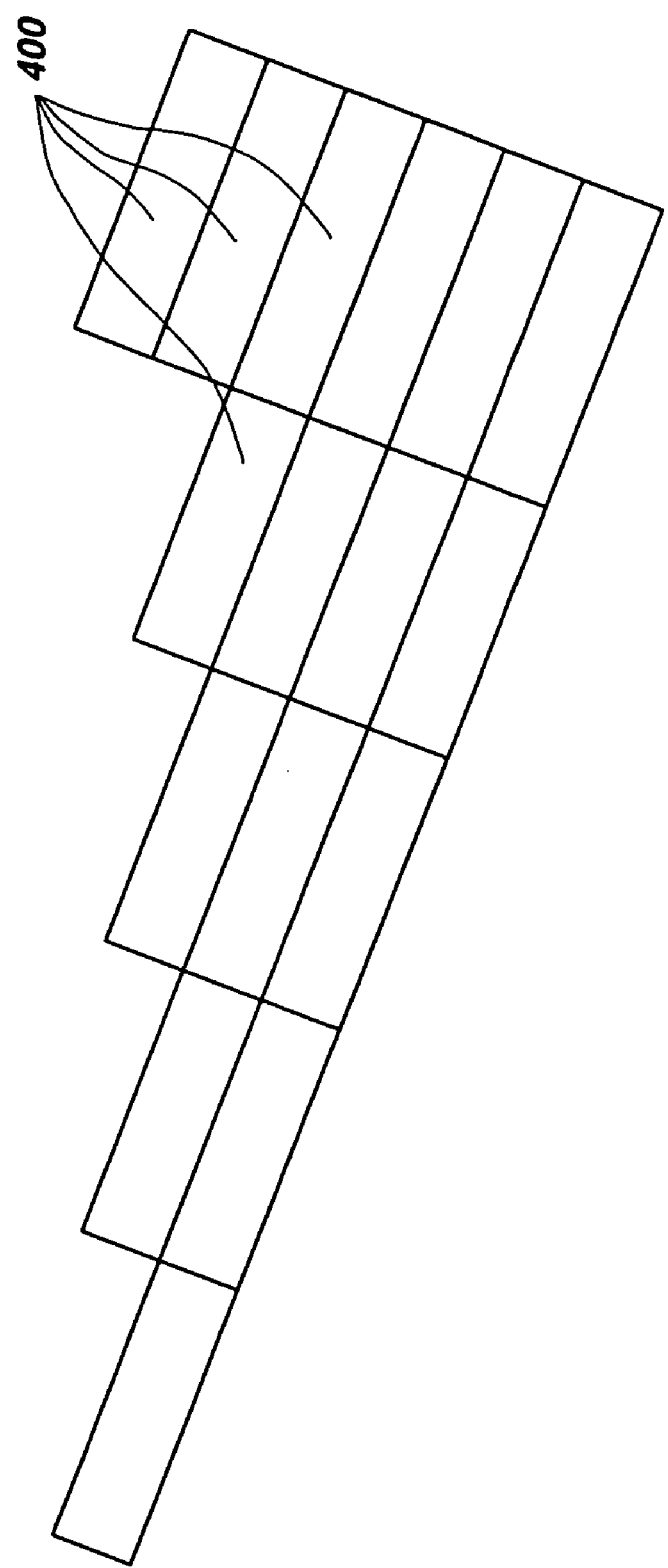
FIG. 6B is a side view of another barrier section made in accordance with the present invention.

The multiple interconnect directions of the casing of the present invention may also be used to create barrier walls, such as laterally stepped barrier wall 502 of FIG. 6A and longitudinally stepped barrier wall 504 of FIG. 6B, in order to contain a zone of interest, eliminating the need for other subterranean containment structures. The work around and stepping ability also allow the casings of the present system to be used to create irregularly shaped barriers around underground objects.

Figure 7A:
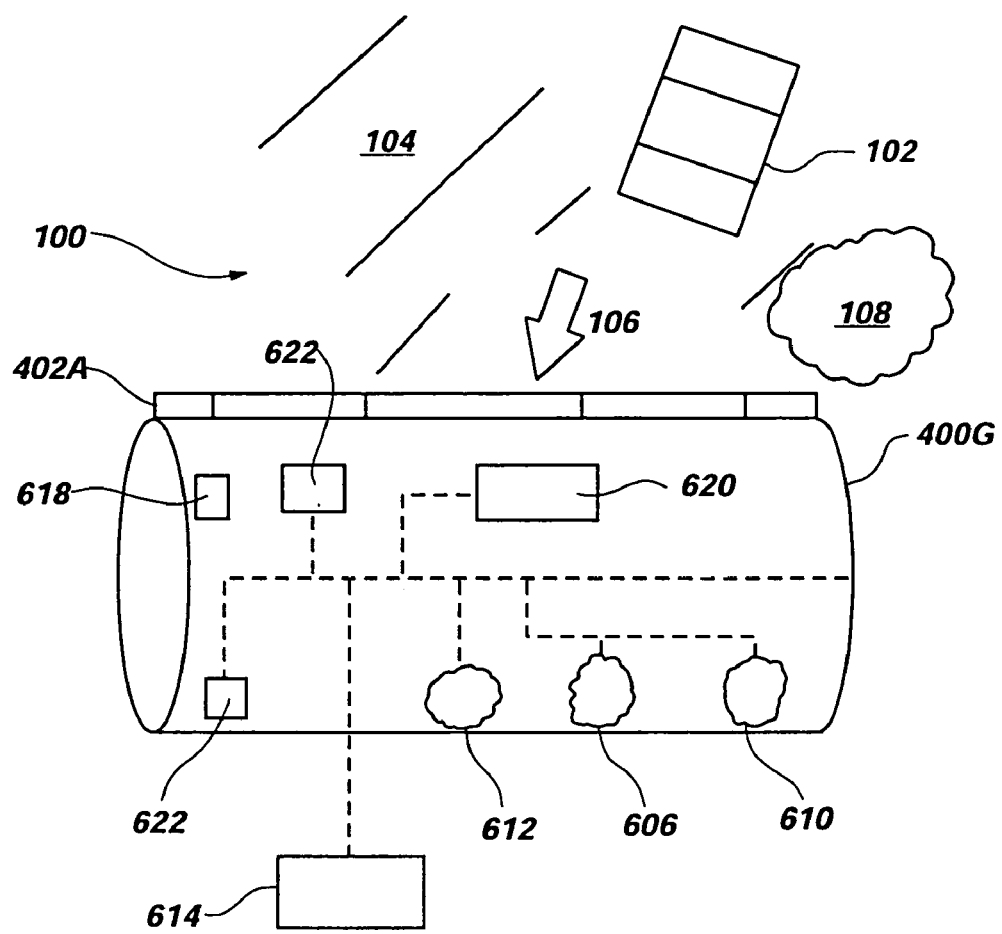
FIGS. 7A and 7B are a schematics of a casing section having a plurality of sensors associated therewith for monitoring the zone of interest and the barrier.
Figure 7B:
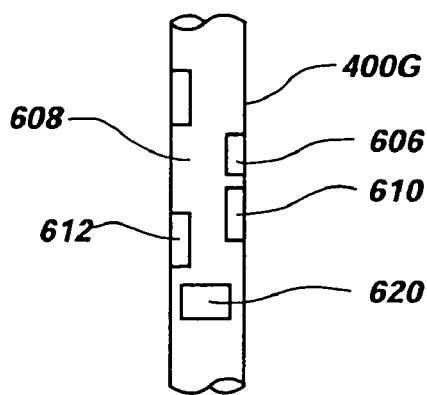

Turning to FIGS. 7A and 7B, a 'smart' casing section 400G is contemplated that incorporates a variety of sensors for monitoring the zone of interest and/or the integrity of the barrier 500. These sensors may be internal or external as desired. With reference first to external sensors, contaminant presence/concentration sensor 606 is recessed in exterior surface 608 of smart casing section 400A and measures both the types and concentration of contaminants, whether present in leachate 106 or in soil 104. In similar fashion, distribution sensor 610 is recessed in exterior surface 608 of smart casing section 400G and measures the spatial distribution of contaminants 108 and/or leachate 106 in soil 104. Likewise, radiation detection and measurement ('RDM') sensor 612 is recessed in exterior surface 608 of smart casing section 400G and monitors and reports radiological activity in zone of interest 100. In one embodiment, presence/concentration sensor 606, distribution sensor 610, and RDM sensor 612 are installed on smart casing section 400G in locations remote from complementary interlocking structures 402A and 402B (or 402C, 402D etc).

In addition to their respective sensing functions, presence/concentration sensor 606, distribution sensor 610, and RDM sensor 612 may be configured to feed data to real-time data management system 614 for processing and analysis. Real-time data management system 614 may be a computer system integrating hardware, software, sensor output, positioning information and data analysis functions.

A variety of different sensor types are contemplated as being suitable for performing the functions of contaminant presence/concentration sensor 606, distribution sensor 610, and RDM sensor 612. In particular, the function of contaminant presence/concentration sensor 606 may be performed by a surface acoustic wave (SAW) sensor or solid state sensor such as a field effect transistor (FET), as well as by Fourier transform infrared spectrometry (FTIR), time domain electromagnetics, or the like. Time domain electromagnetics, which measure presence, location, and concentration of contaminants by measuring conductivity and dielectric contrasts of the medium in which they are located, are also suitable for performing the spatial distribution measurement function of distribution sensor 610. The radiation detection and measurement functions of RDM sensor 612 may be performed by gamma-ray spectrometry, plastic scintillators, scintillating fibers, miniature chamber detectors, or the like. Note that this invention contemplates as within its scope various other types of sensors that will provide the functionality described herein.

As indicated in FIGS. 7A and 7B, smart casing section 400G may also include a variety of internal sensors for performing a number of different functions. Because these sensors are internal to smart casing section 400A, they may permit monitoring of various aspects of the installation while the installation is in progress. In view of the fact that joints between longitudinally successive casing sections 400 represent a potential leak-through path for leachate 106 and contaminants 108, the integrity of those joints is of particular concern. Accordingly, joint integrity sensor 618 evaluates the integrity of the joint between a smart casing section 400G and longitudinally adjacent casing sections 400. That is, joint integrity sensor 618 determines whether there are cracks, voids, or other defects in the intercasing joint that could permit leak through of leachate 106 and/or contaminants 108, and joint integrity sensor 618 also detects the onset and growth of cracks and voids in the intercasing joint. As with presence/concentration sensor 606, distribution sensor 610, and RDM sensor 612, joint integrity sensor 618 may be configured to feed data to a real-time data management system 614 for processing and analysis.

Joint integrity may be evaluated in any desired and appropriate way. For example, acoustic/ultrasonic time domain reflectometry sensors that detect cracks and large voids in structures such as smart casing section 400G may be used. Also, known optical fiber sensors that employ fiber optic principles to make strain measurements in a casing section 400 and thereby detect the onset and growth of voids and cracks in that casing 400 may be used. Because joint integrity can be meaningfully evaluated in a variety of different ways, any sensor type that would be suitable for directly or indirectly measuring and evaluating joint integrity may be used. Note also that the aforementioned sensor types are equally suitable for evaluating the integrity of the structure of smart casing section 400G itself, that is, they are not limited solely to joint integrity applications.

In addition to containing sensors for evaluating the structure of casing 400 and joint integrity, a smart casing section 400G may also include a migration sensor 620 for detecting migration and leakage of leachate 106 and contaminants 108. A migration sensor 620 may be a sensor incorporating fiber optic coupled optical spectroscopy functionality for measuring, for example, volatile organic compounds (VOCs) that may have leaked through smart casing section 400G. However other migration sensors suitable for measuring chemical migration, and emission of VOCs and the like are contemplated as being within the scope of the present invention. As indicated in FIG. 7, migration sensor 620 may be configured to feed data to real-time data management system 614 for processing and analysis.

Smart casing section 400G may also include one or more predictive sensors 622 for identifying failure precursors in barrier 500 or in a casing section 400G. One possible predictive sensor 622 measures changes in the dielectric permeability and/or permittivity of the barrier 500. Alternatively, predictive sensor 622 could be an electrical source and corresponding antenna arrays (not shown) that may be used to measure changes in resistivity of barrier 500. A change in resistivity from a baseline measurement taken at time of installation of barrier 500 would indicate a break.

Predictive sensors 622 may also be a sacrificial cathode or the like for detecting conduction paths through a casing 400. Existence of a conduction path through a casing section 400 may indicate that a failure of that casing section 400 will ultimately occur. Because galvanic action only occurs when there is a conduction path, galvanic action at the sacrificial cathode serves to predict such failure. This will provide further protection against corrosion. Alternatively, an external galvanic potential source may be provided to effect such protection. As with the other sensors, predictive sensor 622 may feed data to real time data management system 614 for processing.

Using a barrier 500 that contains sensors as outlined in the preceding paragraphs, a number of tests may be conducted to assure the integrity of a barrier. For example, interlock void defects may be detected by conducting an ultrasonic or other nondestructive line scan between the wall of casing 400 and the male interlock structure 402A to verify seal integrity by lack of void defects in the interlock sealant within the female interlock structure 402B, 402C, and 402D. Multiple scans may be conducted across different casing profiles. Similarly, interlock bonding defects may be detected by conducting an ultrasonic or other nondestructive line scan between the wall of casing 400 and the male interlock structure 402A to verify seal integrity by lack of bonding defects at the casing 400 wall or male interlock structure 402A surface. Casing end joints (where casing sections are joined end to end) defects may also be detected by conducting an ultrasonic or other nondestructive line scan across casing end joints to verify seal integrity by lack of void or bonding defects. Multiple scans may be done for each of these tests.

Smart casings 400G may also be used to monitor a zone of interest 100 for criticality. For example, where a zone of interest 100 contains fissable isotopes, these can achieve a critical state, if present in sufficient quantity and concentration. Using RDMs and presence/concentration sensors on or connected to the barrier 500, the concentrations of such isotopes in the zone of interest may be monitored to provide potential warnings prior to reaching a critical state.

It will be appreciated that using a barrier constructed according to the present invention, different treatment options may be practiced. For example, the flow rate of leachate or other effluent through a zone of interest may be controlled by restricting flow through a barrier 500. This allows the saturation rate of the zone of interest 100 (or the saturation rate of a semipermeable portion of the barrier 500 surface) to be controlled, optimizing the treatment rate.

The present invention has been described in terms of buried waste, but the systems and methods of the present invention have other applications. For instance, a barrier 500 having perforated or semipermeable casings may be using in mining operations to collect the minerals of interest. For example, a barrier 500 may be constructed in a formation from which the mineral of interest may be leached into the casings. When the collection of the mined material reaches a predetermined level, it is easily extracted from collectors in the casings. Other applications include perforated barriers 500 used for agricultural purposes. For example, the water used to irrigate an agricultural area typically drains in a particular location. A containment barrier 500 having perforated casings can be installed in the drainage area, acting similar to drainage tiles to direct the flow of drainage as desired. Casings 400 may also be used to stabilize earth or subterranean formations or provide structural support for construction of buildings, tunnels or other manmade structures, to divert groundwater, or to provide hydrological stabilization during dam construction.

It will be apparent that details of the apparatus and methods herein described can be varied considerably without departing from the concept and scope of the invention. The claims alone define the scope of the invention as conceived and as described herein.

We claim:

1. A method of sealing adjacent interlocking casings, comprising:
    entraining a volume of a thermoplastic sealant in at least one female interlock structure recess of a first casing section comprising a hollow elongated body;
    inserting a male interlock structure of a second laterally adjacent casing section comprising a hollow elongated body into the at least one female interlocking recess; and
    applying heat to the at least one female interlocking recess to cause the thermoplastic sealant to flow and create a seal between the casings.

2. The method according to claim 1, wherein entraining a volume of thermoplastic sealant comprises entraining a volume of thermoplastic sealant that is less than the volume of the at least one female interlock structure recess.

3. The method according to claim 1, further comprising reestablishing the seal in the event of a breach by reheating the at least one female interlock structure recess to cause the thermoplastic sealant to reflow and reestablish the seal.

4. The method according to claim 1, wherein the thermoplastic sealant is selected from the group comprising waxes, tars, polymers and polysiloxane.

5. The method according to claim 4, wherein the thermoplastic polymer is a self-healing sealant.

6. A method of sealing adjacent interlocking casings, comprising:
    entraining a volume of a thermoplastic sealant in at least one female interlock structure recess of a first casing section;
    inserting a male interlock structure of a second adjacent casing section into the at least one female interlocking recess;
    applying heat to the at least one female interlocking recess to cause the thermoplastic sealant to flow and create a seal between the casings; and
    reestablishing the seal in the event of a breach by reheating the at least one female interlock structure recess to cause the thermoplastic sealant to reflow and reestablish the seal.

7. The method according to claim 6, wherein entraining a volume of thermoplastic sealant comprises entraining a volume of thermoplastic sealant that is less than the volume of the at least one female interlock structure recess.

8. The method according to claim 6, wherein the thermoplastic sealant is selected from the group comprising waxes, tars, polymers and polysiloxane.

9. The method according to claim 8, wherein the thermoplastic polymer is a self-healing sealant.

* * * * *